March 10, 1942. M. WARE 2,275,576

INTERNAL COMBUSTION ENGINE

Filed July 5, 1940

INVENTOR.
Marsden Ware
BY
Tibbetts & Hart
ATTORNEYS

Patented Mar. 10, 1942

2,275,576

UNITED STATES PATENT OFFICE 2,275,576

INTERNAL COMBUSTION ENGINE

Marsden Ware, Huntington Woods, Mich., assignor to Packard Motor Car Company, Detroit, Mich., a corporation of Michigan Application July 5, 1940, Serial No. 343,959

6 Claims. (Cl. 123—196)

This invention relates to heat exchange systems, and more particularly to cooling systems for the lubricating oil of engines.

Engine lubricating systems are now equipped with heat exchangers that keep the lubricant within a prescribed temperature range. In one type of such systems, the hot oil is shunted through a conduit means with which is associated a heat exchanger. A by-pass conduit is connected with the conduit means so that it circumvents the heat exchanger, and controlling flow through the by-pass conduit is a thermostatically responsive valve located in the conduit means beyond the heat exchanger. All of the cooled oil from the heat exchanger and the uncooled oil from the by-pass conduit flows past the valve and the operation of the valve is controlled by the temperatures of such oil, the valve being of a character such that it opens with reduced oil temperature. It has been found that the volume of cooled oil passing by the valve has the effect of holding the valve open more than is desired to maintain the temperature of the oil returning to the engine lubricating system within a desired range.

An object of the invention is to reduce the temperature range of oil returning to an engine in a cooling system of the type referred to.

Another object of this invention is to more closely confine the temperature range of oil returning to an engine from a heat exchange system, of the type referred to, by reducing the volume of cooled oil passing by the thermostatically controlled valve.

Another object of the invention is to provide an oil cooling system, of the character referred to, with a shunt arrangement for reducing the temperature range of oil returning to the engine.

Other objects of the invention will appear from the following description taken in connection with the drawing, which forms a part of this specification, and in which.

Figure 1:
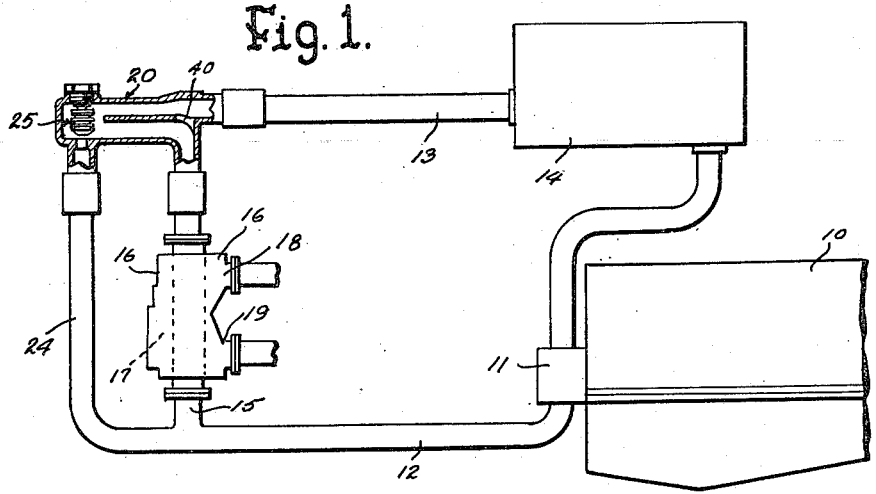
Fig. 1 is a side elevational view of the oil cooling system applied to an engine.
Figure 2:
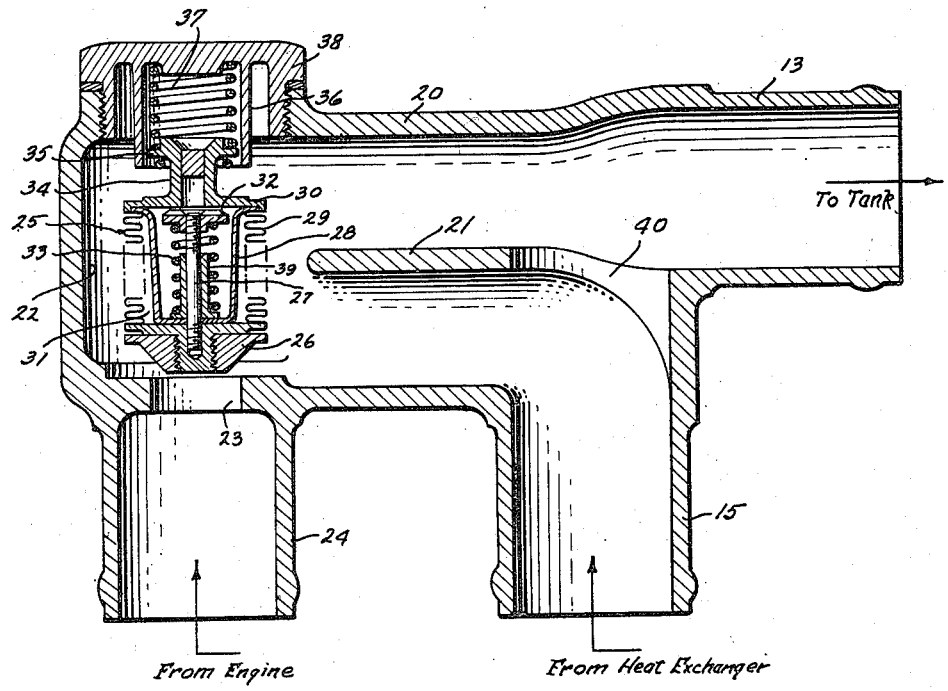
Fig. 2 is a vertical sectional view of the temperature control portion of the cooling system.

In the drawing, the engine 10 is of a conventional type having a circuit for lubricating oil leading to and from the oil pump structure 11 which is of a conventional type.

Connected with the oil pump structure is a heat exchange system by means of which the engine lubricating oil can be maintained within a desired temperature range. A main conduit means is provided for carrying the oil to and from the pump structure and consists of an outlet conduit 12 and a return conduit 13 in which is interposed a tank 14. The outlet and return conduits are joined by a connector conduit 15. A suitable heat exchanger is associated with the connector conduit and is illustrated as a surrounding sleeve 16 forming a chamber 17 having an inlet 18 and an outlet 19. The inlet and outlet can be connected with suitable piping and pump means for circulating a coolant through the chamber. For example, if the engine is used to propel a boat, the inlet and outlet can be connected with the water on which the boat is riding.

The coupling 20 joining the connector conduit with the return conduit has an internal dividing flange or baffle 21 for directing oil flow through an end chamber 22 overlying an opening 23 connected with a by-pass conduit 24 leading from the outlet conduit 12. In this chamber is arranged a thermostatically controlled valve structure 25 for controlling the flow of uncooled oil through opening 23.

The valve structure can be of a conventional form and includes a valve member 26 fixed to a stem 27 that is slidable through a casing 28. This casing and an outer bellows 29, fixed to the valve and a head 30 for the casing, forms a chamber 31 in which is carried a thermal responsive agent. On the valve stem is fixed a retainer 32 serving as an abutment for one end of a coil spring 33, the other end of the spring engaging a flanged sleeve 39 seated against the casing. This spring normally exerts pressure tending to collapse the bellows, or in a direction urging the valve to move away from the opening 23.

The casing head 30 is continued as a neck 34 and terminates in a head 35 slidable in a cylindrical flanged portion 36 on a cap 38 screwed into the coupling. Spring 37 in the cap cooperates with head 35 to normally hold the valve structure in a set relation in the chamber. Due to the restriction offered to oil flow by the heat exchanger and for other reasons, oil back pressure sometimes builds up in the outlet conduit and by-pass conduit beyond a desired limit and above such limit the spring 37 will be deflected allowing the valve structure to be moved substantially bodily from the opening 23. Thus the cooling system can be automatically relieved of excessive pressure.

Reduced oil temperature, resulting from the relation of the heat exchanger, will have the effect of allowing collapsing of the thermostatic bellows to thereby open the valve. When the valve is open, then the thermostatic means will be influenced by the average temperature of the uncooled by-passed oil and the cooled oil flowing into chamber 22. When the entire volume of cooled oil flows past the thermostatic means it acts to cause the valve to remain open longer than is desired to maintain a limited temperature range of the oil flowing through the return conduit.

In order to more accurately control this temperature range of the oil in the return conduit, it is proposed to shunt a considerable portion of the cooled oil into the return line and thus influence the action of the thermostatic valve. This shunting of the cooled oil from the valve chamber can be accomplished in various ways. In the illustrated embodiment of the invention this is accomplished by means of a passage 40 provided through the flange 21 aligned substantially axially with the connector conduit. Thus a large portion of the cooled oil will flow directly from the connector conduit to the return conduit through the passage in the flange and a minor portion of the cooled oil will flow around the flange and through the valve chamber. In this manner the valve will be held open shorter periods and within a temperature range determined by the size of opening 40 and the character of the thermostatic portion of the valve structure.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A heat exchange system for pressure lubricating systems comprising outlet and return conduits, conduit means connecting the outlet and return conduits, oil cooling means in the connecting conduit means, a bypass conduit connected to the outlet and return conduits and circumventing the oil cooling means, a thermostatically controlled valve in the return conduit controlling the flow of bypassed oil into the return conduit, and a connection directly from the connecting conduit means to a portion of the return conduit beyond the thermostatically controlled valve, the oil passing through said connection having no thermal influence on the operation of said valve.

2. A heat exchange system for pressure lubricating systems comprising oil conduit means leading from and returning to the lubricating system, a heat exchanger in the conduit means, a baffle in the conduit means beyond the heat exchanger, a bypass conduit for conducting oil from an uncooled portion of the conduit means to a cooled portion thereof adjacent the outlet end of the baffle, a thermostatically controlled valve in the conduit means regulating oil flow from the bypass conduit, and passage means through the baffle through which a portion of the cooled oil can flow without influencing the operation of the thermostatically controlled valve.

3. A heat exchange system comprising oil conduit means leading from and to a pressure lubricating system for an engine, a cooler connected in thermal relation with the conduit means, a bypass conduit connected in the conduit means through which oil can be shunted around the cooler, a thermostatically controlled valve structure in the return portion of the conduit means controlling flow through the bypass conduit, and means in said conduit means for directing a portion of the cooled oil to said valve structure and shunting another portion of the cooled oil away beyond the valve structure and out of the thermal influence therewith.

4. An engine lubricating system comprising oil conduit means leading from and to the engine, a bypass conduit connected in the conduit means, a thermostatically controlled valve in the conduit means controlling the flow of oil from the bypass conduit to the conduit means, and means for shunting a portion of the oil from the conduit means around the thermostatically controlled valve without thermally influencing operation of the value.

5. A pressure lubricating system comprising outlet and return conduits, conduit means connecting the outlet and return conduits, a bypass conduit connected to the outlet and return conduits, a thermostatically controlled valve in the return conduit controlling the flow of bypassed oil into the return conduit, and a connection directly from the connecting conduit means to the return conduit shunting the region of the thermostatically controlled valve.

6. A heat exchange system for a pump operated lubricating system, comprising a tank, oil conduit means leading from the lubricating system pump to the tank, a connection leading from the tank to the pump, a heat exchanger in the oil conduit means, a bypass conduit connected in the conduit means and circumventing the heat exchanger, a thermostatically controlled valve in the conduit means controlling the flow of oil from the bypass conduit, and means for shunting a portion of the oil cooled by the heat exchanger to the tank without thermally influencing the thermostatically controlled valve.

MARSDEN WARE.